(12) United States Patent
Hu et al.

(10) Patent No.: US 10,817,135 B2
(45) Date of Patent: Oct. 27, 2020

(54) GRAPHICAL USER INTERFACE DISPLAYING COLLECTIBLE ICON ANIMATIONS

(71) Applicant: GOOGLE LLC, Mountain View, CA (US)

(72) Inventors: Dennis Yung-Chi Hu, Redwood City, CA (US); Kimberly Cianci, Tiburon, CA (US); Chunxiao Diao, Mountain View, CA (US); Min-Hao Wu, Mountain View, CA (US); Clifford Tse-Yan Chan, San Francisco, CA (US); Mallinath Bareddy, Cupertino, CA (US); Denise Ho, Los Altos, CA (US); Michal Palczewski, San Jose, CA (US)

(73) Assignee: Google LLC, Mountain View, CA (US)

( * ) Notice: Subject to any disclaimer, the term of this patent is extended or adjusted under 35 U.S.C. 154(b) by 13 days.

(21) Appl. No.: 15/998,435

(22) Filed: Aug. 15, 2018

(65) Prior Publication Data

US 2019/0146654 A1      May 16, 2019

Related U.S. Application Data

(60) Provisional application No. 62/584,728, filed on Nov. 10, 2017.

(51) Int. Cl.
*G06F 3/0481* (2013.01)
*G06Q 30/02* (2012.01)
(Continued)

(52) U.S. Cl.
CPC ......... *G06F 3/04817* (2013.01); *G06Q 20/12* (2013.01); *G06Q 20/3278* (2013.01);
(Continued)

(58) Field of Classification Search
CPC .. G06F 3/04817; G06Q 20/12; G06Q 20/405; G06Q 30/0239; G06Q 30/0212;
(Continued)

(56) References Cited

U.S. PATENT DOCUMENTS

| 8,108,459 | B1 * | 1/2012 | Hoffman | ............... H04L 65/403 |
| | | | | 709/203 |
| 9,129,342 | B2 * | 9/2015 | Denk, Jr. | ............... G06Q 90/00 |

(Continued)

FOREIGN PATENT DOCUMENTS

| WO | 2017/100755 A1 | 6/2017 |
| WO | 2019/094058 A1 | 5/2019 |
| WO | 2019/125552 A1 | 6/2019 |

OTHER PUBLICATIONS

Berlea "International Search Report and Written Opinion issued in International Application No. PCT/US2018/051242", dated Apr. 4, 2019, 13 pages.

(Continued)

*Primary Examiner* — Matthew Ell
(74) *Attorney, Agent, or Firm* — Dority & Manning, PA

(57) ABSTRACT

Rendering graphical user interfaces to display post-interaction collectible icon animations experiences to users comprises an application of a user. An application provides a display to a user to initiate a wireless interaction and receives a notification of a tap of the one or more computing devices to conduct a pending interaction at a third party system. The application receives a notification from the third party system that the interaction has been conducted and communicates to an application system associated with the application that the interaction has been conducted. The application receives from the application system a post-interaction collectible icon animation. The graphical user interface renders the post-interaction collectible icon animation for display to the user. The graphical user interface (Continued)

allows the user to collect the collectible icon as part of a set for future display or sharing with a social network.

16 Claims, 11 Drawing Sheets

(51) Int. Cl.
*G06Q 20/40* (2012.01)
*G06Q 20/12* (2012.01)
*G06Q 20/32* (2012.01)
*G06Q 20/36* (2012.01)
*G06T 13/80* (2011.01)

(52) U.S. Cl.
CPC ............ *G06Q 20/36* (2013.01); *G06Q 20/405* (2013.01); *G06Q 30/0212* (2013.01); *G06Q 30/0238* (2013.01); *G06Q 30/0239* (2013.01); *G06T 13/80* (2013.01)

(58) Field of Classification Search
CPC ............... G06Q 30/0238; G06Q 20/36; G06Q 20/3278; G06T 13/80
See application file for complete search history.

(56) References Cited

U.S. PATENT DOCUMENTS

| | | | |
|---|---|---|---|
| 2002/0054750 A1* | 5/2002 | Ficco | G11B 27/034 386/214 |
| 2002/0077978 A1* | 6/2002 | O'Leary | G06Q 20/04 705/40 |
| 2002/0179704 A1* | 12/2002 | Deaton | G06Q 20/04 235/383 |
| 2003/0069792 A1* | 4/2003 | Blumenthal | G06Q 20/02 705/16 |
| 2012/0284105 A1* | 11/2012 | Li | G06Q 30/02 705/14.23 |
| 2013/0325653 A1 | 12/2013 | Ouimet | |
| 2013/0339190 A1 | 12/2013 | Yu et al. | |
| 2014/0100975 A1* | 4/2014 | Van | G06Q 20/32 705/21 |
| 2015/0120414 A1 | 4/2015 | Van Stolk et al. | |
| 2015/0278803 A1 | 10/2015 | Champaneria et al. | |
| 2016/0104232 A1 | 4/2016 | Perks et al. | |
| 2019/0187864 A1 | 6/2019 | Yeh et al. | |

OTHER PUBLICATIONS

Jung "U.S. Office Action issued in copending U.S. Appl. No. 16/132,307, filed Sep. 14, 2018", dated Sep. 27, 2019, 15 pages.
Berthon, "International Search Report and Written Opinion issued in International Application No. PCT/US2018/000200", dated Nov. 15, 2018, 26 pages.
U.S. Appl. No. 16/132,307 Shih-Hao Yeh et al. filed Sep. 14, 2018.

* cited by examiner

205

```
┌─────────────────────────────────────────────────────┐
│ Method to register a user with digital wallet       │
│ network and configure a digital wallet application  │
└─────────────────────────────────────────────────────┘
                         │
                         ▼                        305
┌─────────────────────────────────────────────────────┐
│ User registers a digital wallet account on a        │
│ digital wallet system                               │
└─────────────────────────────────────────────────────┘
                         │
                         ▼                        310
┌─────────────────────────────────────────────────────┐
│ User downloads a digital wallet application on a    │
│ user computing device                               │
└─────────────────────────────────────────────────────┘
                         │
                         ▼                        315
┌─────────────────────────────────────────────────────┐
│ User configures one or more payment accounts on     │
│ the digital wallet account                          │
└─────────────────────────────────────────────────────┘
                         │
                         ▼                        320
┌─────────────────────────────────────────────────────┐
│ User configures rules for applying payment accounts │
│ on the digital wallet application                   │
└─────────────────────────────────────────────────────┘
                         │
                         ▼
                     ┌───────┐
                     │ 210,  │
                     │ Fig. 2│
                     └───────┘
```

Fig. 3

GRAPHICAL USER INTERFACE DISPLAYING COLLECTIBLE ICON ANIMATIONS

CROSS-REFERENCE TO RELATED APPLICATION

This patent application claims priority to U.S. Provisional Patent Application No. 62/584,728, filed Nov. 10, 2017, and entitled "Graphical User Interface Displaying Collectible Icon Animations." The entire contents of the above-identified application are hereby fully incorporated herein by reference.

TECHNICAL FIELD

The present disclosure relates to a graphical user interface that displays post-interaction collectible icon animations on a user computing device. More specifically, the present disclosure relates to a graphical user interface to present a collectible icon and an associated animation to a user after a desired interaction to incentivize and encourage additional actions.

BACKGROUND

Interactions between computing systems can be conducted by an instrument, such as a magnetic stripe card or a chip card, with a terminal of a host computing system, such as a merchant. The instrument may alternatively be presented to the terminal by a user computing device with the capability of communicating with a reader via contactless communication.

The user computing device can communicate with the terminal or with a contactless instrument via near field communication ("NFC"), BLUETOOTH, barcode, Wi-Fi, infrared, or any other suitable communication technology. The user computing device can host an application that can be used to communicate with the contactless instrument or a terminal.

The terminal can obtain information from the contactless instrument. An interaction can be initiated by a "tap," swipe," or other motion of the contactless instrument or via a feature selection from the user. The terminal can submit interaction details to a central network process further interactions.

Providers of applications, account providers, card issuers, merchants, and others may desire to drive a greater number of interactions, such as transactions, towards using a new technology. Because users have other options to initiate and conduct an interaction, these entities desire to have a manner of encouraging and incentivizing further wireless interactions, such as wireless transactions. However, wireless interactions may be intimidating to new users, despite the fact that wireless interactions may be quicker, more efficient, and just as secure as conventional interactions. Thus, when users do not elect to use an incentivized interaction technology, all of the related computing devices are forced to perform additional processing and expend additional capacity.

SUMMARY

Techniques herein provide computer-implemented methods, systems, and computer program products to render graphical user interfaces to display post-interaction collectible icon animations to users. The method comprises an application system employing a server configured to manage an account and an application for a user. An application displays on a user interface to allow a user to initiate a wireless interaction and receives a notification of a tap of the one or more computing devices to conduct a pending interaction at a third party system, such as a merchant system. The application receives a notification from a third party system that the interaction has been conducted or recognizes that the completed interaction, and communicates to an application system associated with the application that the interaction has been conducted. The application receives from the application system post-interaction collectible icon animations. A graphical user interface on the user computing device renders the post-interaction collectible icon animations for display to the user. The application stores the collectible icon for future display alone or with other collectible icons. The application provides a graphical user interface to the user to share the collectible icon with a social network of the user.

In certain other example aspects described herein, systems and computer program products to render graphical user interfaces to display post-interaction collectible icon animations to users are provided.

These and other aspects, objects, features and advantages of the example embodiments will become apparent to those having ordinary skill in the art upon consideration of the following detailed description of illustrated example embodiments.

BRIEF DESCRIPTION OF THE DRAWINGS

FIG. 3 is a block flow diagram depicting a method to register a user with digital wallet network and configure a digital wallet application, in accordance with certain examples.

DETAILED DESCRIPTION OF THE EXAMPLE EMBODIMENTS

Overview

Figure 1:
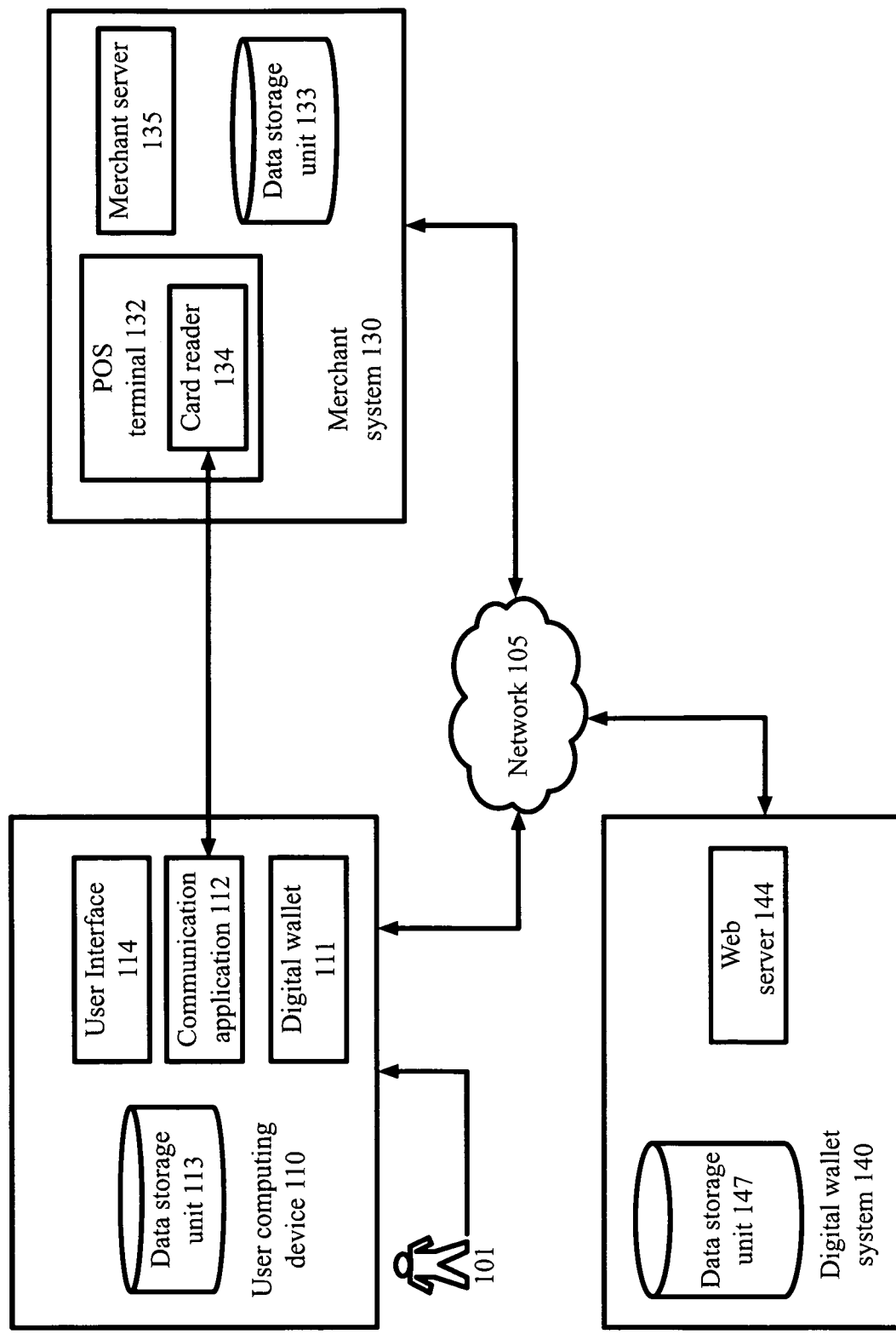
FIG. 1 is a block diagram depicting a system to display a graphical user interface to display post-transaction collectible icon animations to a user computing device, in accordance with certain examples.

In certain examples, an application system, such as a digital wallet system provides graphical user interfaces that display post-interaction collectible icon animations to a user. In an example, the interaction may be a transaction. The digital wallet system displays a collectible icon and an associated animation to a user to incentivize additional NFC transactions.

In an example embodiment, a user employs a user computing device to register and configure an account, such as a digital wallet account. The user downloads an application, such as a digital wallet application on the user computing device, such as a mobile smartphone. The user associates one or more payment accounts with the digital wallet account. The payment accounts may be credit card accounts, debit accounts, bank accounts, stored value accounts, or any other suitable payment accounts.

In an example, the payment instrument is used in a transaction with a third party system terminal, such as a merchant system point of sale ("POS") terminal. In an example, the user approaches a merchant system POS terminal with one or more items for purchase. The user swipes or taps the user computing device with the payment instrument on a POS terminal reader and initiates a communication between the payment instrument and the POS terminal. The POS terminal may employ a card reader or other hardware or software to communicate wirelessly with the payment instrument via NFC or other suitable technology. The digital wallet application transmits the payment account information to the reader on the POS terminal. The transaction is conducted with a payment processing system. Throughout the specification, the term transaction is used as a example interaction between the user computing device and the merchant system. In another example, any other suitable type of interaction that is not a transaction may be utilized, such as a check-in interaction, a verification interaction, an access interaction, or any other suitable interaction.

The digital wallet application communicates to the digital wallet system that the transaction was conducted using the preferred communication technology. The digital wallet system communicates a collectible icon and an associated animation to the digital wallet application on the user computing device.

The user interface on the user computing device presents the collectible icon animations to the user as a graphical user interface, and the user may collect the collectible icons or share the collectible icons. For example, the collectible icon animations appear on the display screen of the user computing device to entertain the user. The collectible icons are then stored on a collectible icon card or other storage location to allow the user to access the collectible icon animations or the collectible icons at a later time. The collectible icons may each be a part of a group or set of collectible icons that a user will want to obtain to complete the set. For example, each collectible icon may be a part of a group of characters that are part of a team, such as a sports team or a superhero team. The collectible icon card may have a slot or location to place each obtained collectible icon to indicate that the particular collectible icon in the set has been obtained. When the set is complete, the collectible icon card may indicate that the set is complete and/or display all of the obtained collectible icons.

The collectible icon animations or the collectible icons themselves may be shared with others via a social network of the user. For example, the graphical user interface displays an interface object, such as a "share" button, that allows a user to share with a social network that a particular collectible icon has been obtained. The user may additionally select an interface object to show the collectible icon animation associated with a particular collectible icon at any suitable time. The collectible icon animation may be configured to display at any other suitable time, such as when the user opens the digital wallet application or when a user attempts a subsequent transaction.

The display of the post-transaction collectible icon animations gives the user a sense of surprise and anticipation. The display incentivizes the user to conduct additional transactions using the preferred transaction technology because the user will want to revisit the surprise and anticipation.

While certain examples herein are depicted with an NFC transaction at a merchant location, the method may alternatively be performed in a different transaction environment. For example, the method may be used in an online transaction. Instead of the graphical user interface displaying the post-transaction experience after an NFC transaction the graphical user interface may display the post-transaction experience after an online transaction with a website of a merchant system. Any other suitable transaction type may utilize the method described herein. For example, peer to peer transactions or Bluetooth transactions may be used.

By using and relying on the methods and systems described herein, the graphical user interface of the digital wallet system dynamically provides a post-transaction collectible experience to a user. As such, the systems and methods described herein may be employed to surprise and delight a user to incentivize that user to use the digital wallet system more frequently. The system is improved for the merchant system in that NFC transactions or other virtual transactions, which are faster and more efficient, happen more frequently. The offers are improved for user in that they enjoy the experience, but also obtain faster and more efficient transactions with the merchant. Hence, the methods and systems described herein permit the computing systems of the user, the digital wallet system, and the merchant system to all operate more efficiently.

Example System Architectures

Turning now to the drawings, in which like numerals represent like (but not necessarily identical) elements throughout the figures, example embodiments are described in detail.

FIG. 1 is a block diagram depicting a system 100 to display a graphical user interface to display post-transaction collectible icon animations to a user computing device 110, in accordance with certain examples. In some embodiments, a user 101 associated with a user computing device 110 must install an application and/or make a feature selection to obtain the benefits of the techniques described herein.

As depicted in FIG. 1, the system 100 includes network computing devices 110, 130, and 140 that are configured to communicate with one another via one or more networks 105 or via any suitable communication technology.

Each network 105 includes a wired or wireless telecommunication means by which network devices (including devices 110, 130, and 140) can exchange data. For example, each network 105 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data. Throughout the discussion of example embodiments, it should be understood that the terms "data" and "information" are used interchangeably herein to refer to text, images, audio, video, or any other form of information that can exist in a computer-based environment. The communication technology utilized by the devices 110, 130, and 140 may be similar networks to network 105 or an alternative communication technology.

Each network computing device 110, 130, and 140 includes a computing device having a communication module capable of transmitting and receiving data over the network 105 or a similar network. For example, each network device 110, 130, and 140 can include a server, desktop computer, laptop computer, tablet computer, a television with one or more processors embedded therein and/or coupled thereto, smart phone, handheld or wearable computer, personal digital assistant ("PDA"), wearable devices such as smart watches or glasses, or any other wired or wireless, processor-driven device. In the example embodiment depicted in FIG. 3, the network devices 110, 130, and 140 are operated by end-users or consumers, merchant system operators, and digital wallet system operators, respectively.

The user 101 can use the communication application 112 on a user computing device 110, which may be, for example, a web browser application or a stand-alone application, to view, download, upload, or otherwise access documents or web pages via a distributed network 105. The communication application 112 can interact with web servers or other computing devices connected to the network 105, including the web server 144 of the digital wallet system 140.

In another example, the communication application 112 communicates with devices in the merchant system 130 via near field communication ("NFC") or other wireless communication technology, such as Bluetooth, WiFi, infrared, or any other suitable technology. As used throughout the specification, the term "NFC" will be used to represent any wireless communication technology. The communication application 112 may use NFC to communicate payment information, receive transaction data, or perform any other suitable tasks.

The user computing device 110 includes a user interface 114 that is used to display a graphical user interface and other user interfaces. The user interface 114 may be used to display information to the user 101 to allow the user 101 to interact with the digital wallet system 140, the digital wallet application 111, and others. The user interface 114 receives user input for transactions and displays results to the user 101. In certain examples, the user interface 114 may be managed by the digital wallet system 140. The user interface 114 may be accessed by the user computing device 110. The graphical user interface 114 may display the webpage 144 of the digital wallet system 140. In certain examples, the user interface 114 may be managed by a merchant system 130 or others. In certain examples, the user interface 114 may be managed by the user computing device 110 and be prepared and displayed to the user 101 based on the operations of the user computing device 110.

The user interface 114 may be used to display a graphical user interface for a post-transaction experience instructions from the digital wallet system 140 to the user 101 as described herein.

The user computing device 110 may include a digital wallet application 111. The digital wallet application 111 may encompass any application, hardware, software, or process the user computing device 110 may employ to assist the user 101 in completing a purchase or performing any other type of interaction. The digital wallet application 111 can interact with the communication application 112 or can be embodied as a companion application of the communication application 112. As a companion application, the digital wallet application 111 executes within the communication application 112. That is, the digital wallet application 111 may be an application program embedded in the communication application 112. In certain embodiments a digital wallet of the user 101 may reside in a cloud computing environment, on a merchant server, or in any other environment.

The digital wallet application 111 communicates transaction status to the digital wallet system 140, such as when a transaction is completed. The digital wallet application 111 receives post-transaction experience instructions from the digital wallet system 140 for display to the user 101 on the graphical user interface 114.

The user computing device 110 also includes a data storage unit 113 accessible by the digital wallet application 111, the communication application 112 or other applications. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In certain embodiments, the data storage unit 113 may reside in a cloud based computing system.

The digital wallet system 140 may be any system that manages, configures, enables, or otherwise services a digital wallet account for a user 101 or any other type of interaction account. The digital wallet system 140 may provide a mechanism for a user 101 to conduct transactions with a merchant system 130. The digital wallet system 140 may provide software or other applications to a user computing device 110 to conduct digital wallet transactions on the user computing device 110.

The digital wallet system 140 may provide the user 101 with a customer identification ("ID") that identifies the account of the user 101 on the digital wallet system 140. The digital wallet system 140 may utilize the customer ID to access loyalty information of the user 101, stored or associated offers, payment instruments, or other suitable data.

The digital wallet system 140 may transmit post-transaction experience instructions to the digital wallet application 111 for display to the user 101 on the user interface 114.

The digital wallet system 140 may include a data storage unit 147 accessible by the web server 144. The example data storage unit 147 can include one or more tangible computer-readable storage devices, or the data storage unit may be a separate system, such as, a different physical or virtual machine, or a cloud-based storage service.

An example merchant system 130 comprises a server 135, a data storage unit 133, a merchant POS terminal 132, and a card reader 134.

In an example embodiment, the server 135 communicates with the digital wallet system 140 to transmit and receive customer IDs, payment information, loyalty information, offers, and other useful interaction data. The merchant server 135 receives data from the POS terminal 132 and assists in conducting transactions with payment processing systems, card issuers, and other suitable systems.

In an example embodiment, the data storage unit 133 can include any local or remote data storage structure accessible to the merchant system 130 suitable for storing information. In an example embodiment, the data storage unit 133 stores encrypted information.

In an example embodiment, the merchant POS terminal 132, such as a cash register, is capable of processing a purchase transaction initiated by a user 101. In an example embodiment, the merchant system 130 operates a commercial store and the user 101 indicates a desire to make a purchase by presenting a form of payment at the merchant POS terminal 132. In an example embodiment, the merchant POS terminal 132 is capable of communicating with the user computing device 110 using an NFC, Bluetooth, and/or Wi-Fi communication method. In an example, the POS terminal 132 utilizes a card reader 134 to communicate with a payment instrument 115 of the user 101. The card reader may receive data from a magnetic stripe, NFC, or any other suitable payment instrument technology. The merchant POS terminal 132 may represent any other type of interaction terminal for communicating with the user computing device 110. For example, the merchant POS terminal 132 may be a kiosk, a security entrance point, or any other interaction terminal.

It will be appreciated that the network connections shown are examples and other means of establishing a communications link between the computers and devices can be used. Moreover, those having ordinary skill in the art having the benefit of the present disclosure will appreciate that the merchant system 130, digital wallet system 140, and the user computing device 110 illustrated in FIG. 1 can have any of several other suitable computer system configurations. For example, a user computing device 110 embodied as a mobile phone or handheld computer may not include all the components described above.

Figure 11:
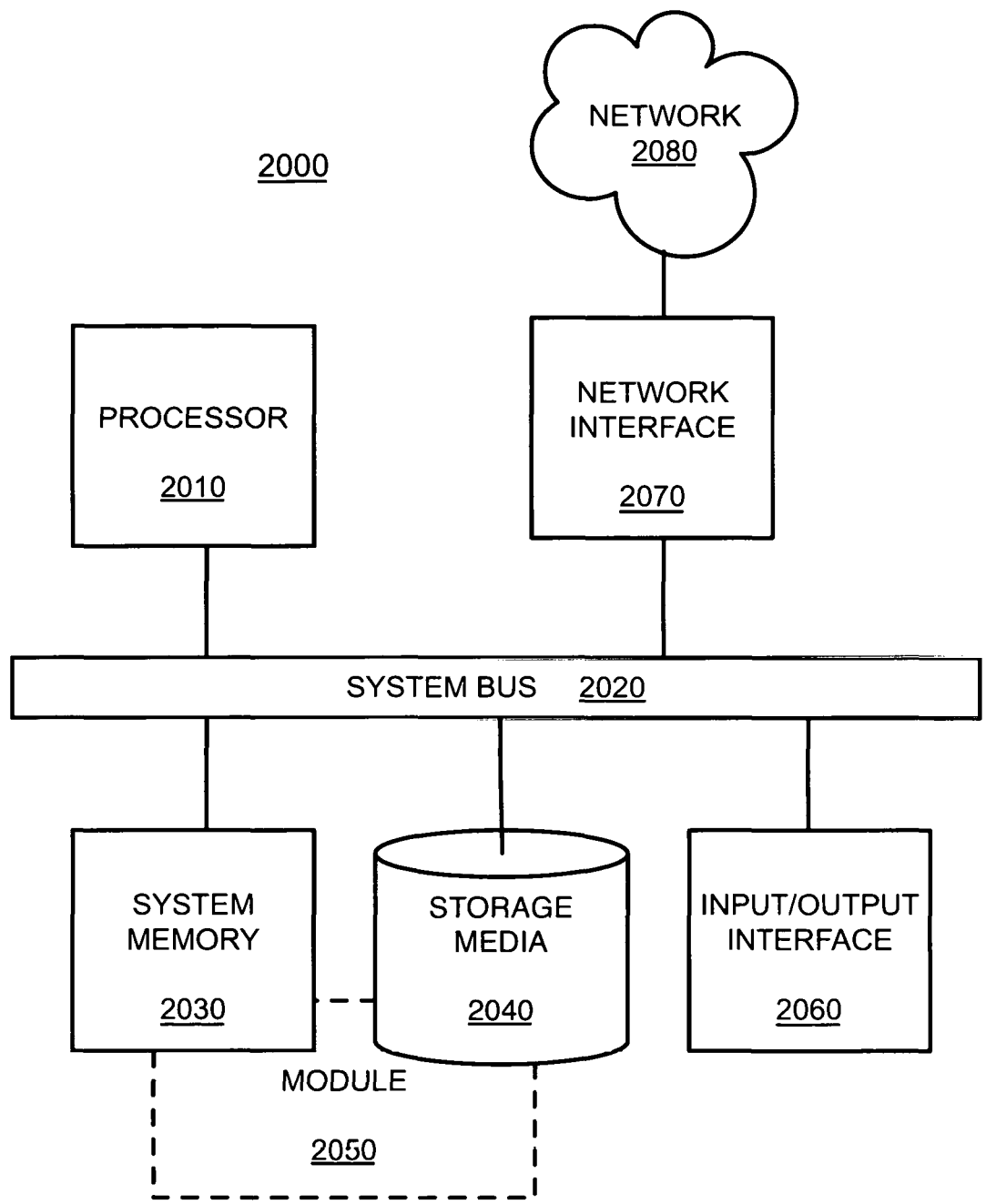
FIG. 11 is a block diagram depicting a computing machine and a module, in accordance with certain examples.

In example embodiments, the network computing devices and any other computing machines associated with the technology presented herein may be any type of computing machine such as, but not limited to, those discussed in more detail with respect to FIG. 11. Furthermore, any modules associated with any of these computing machines, such as modules described herein or any other modules (scripts, web content, software, firmware, or hardware) associated with the technology presented herein may by any of the modules discussed in more detail with respect to FIG. 11. The computing machines discussed herein may communicate with one another as well as other computer machines or communication systems over one or more networks, such as network 105. The network 105 may include any type of data or communications network, including any of the network technology discussed with respect to FIG. 11.

Example Processes

Figure 2:
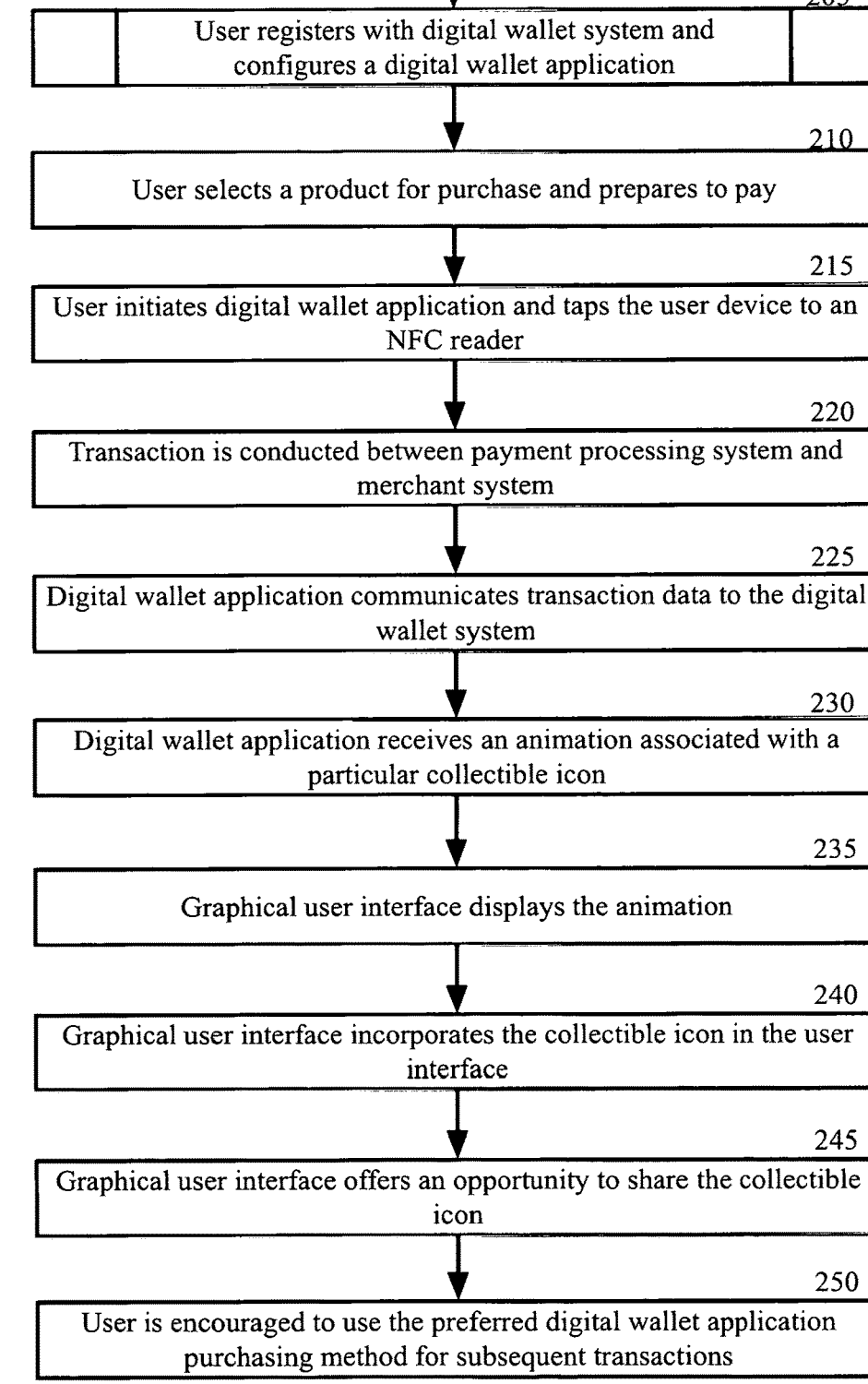
FIG. 2 is a block flow diagram depicting a method to display a graphical user interface to display post-transaction collectible icon animations to a user computing device, in accordance with certain examples.

The example methods illustrated in FIG. 2-3 are described hereinafter with respect to the components of the example operating environment 100. The example methods of FIG. 2-3 may also be performed with other systems and in other environments.

FIG. 2 is a block flow diagram depicting a method 200 to display post-transaction collectible icon animations to a user computing device 110, in accordance with certain examples.

With reference to FIGS. 1-3, in block 205, a user 101 registers with digital wallet system 140 and configures a digital wallet application 114. The features of block 205 are described in greater detail with respect to method 205 of FIG. 3.

FIG. 3 is a block flow diagram depicting a method 205 to register a user 101 with digital wallet system 140 and configure a digital wallet application 111, in accordance with certain examples.

In block 305, a user 101 registers a digital wallet account on a digital wallet system 140. The user 101 may access a webpage of the digital wallet system 140 via the user interface 114 of the user computing device 110 to register an account, select usernames and passwords, and perform other registration tasks. The user 101 may register the account via digital wallet application 114 on the user computing device 110 or via any other suitable method, such as verbally over a telephone.

In block 310, the user 101 downloads a digital wallet application 111 on a user computing device 110. Blocks 305 and 310 may be performed in any suitable order. The digital wallet system 140 provides software to the user computing device 110, via network 105 to install the digital wallet application 111 on the user computing device 110. The user 101 or the digital wallet system 140 may configure the digital wallet application 111 with digital wallet data from the digital wallet system 140. The digital wallet application 111 may be downloaded or accessed from a third party server or any other suitable location. The digital wallet application 111 may alternatively be pre-installed on the user computing device 110 or otherwise come standard with the operating system on the user computing device 110. In certain examples, the digital wallet application 111 is not a transaction related application, but is directed to other types of interactions, such as a loyalty check-in or a secured entry.

In block 315, the user 101 configures one or more payment accounts on the digital wallet account of the digital wallet system 140. In an example, the digital wallet account on the digital wallet system 140 and the digital wallet application 111 may be configured with one or more payment accounts of the user 101. The payment accounts may be credit card accounts, debit accounts, bank accounts, stored value accounts, or any other suitable payment accounts. In certain examples, the digital wallet account is not a transaction related account, but is directed to other types of interactions, such as a loyalty check-in or a secured entry. The digital wallet account may be configured with loyalty information of the user 101 for one or more merchant systems 130. The digital wallet account may be configured with offers associated with the user 101 from merchant systems 130, manufacturers, or other systems.

In block 320, the user 101 configures rules for applying payment accounts on the digital wallet application 140. For example, the user 101 may configure the digital wallet application 140 to default to a particular card unless otherwise instructed. The user 101 may configure the digital wallet application 140 to select a particular card at a particular merchant system 130. The user 101 may configure the digital wallet application 140 to select a particular card for a range of transaction amounts. Any other suitable rule may be configured by the user 101 to streamline the selection of a payment instrument when a transaction is initiated.

From block 320, the method 205 returns to block 210 of FIG. 2.

Returning to FIG. 2, in block 210, a user 101 selects a product for purchase and prepares to pay. For example, if the user 101 is at a physical location of a merchant system 130, the user 101 may select a product for purchase and approach a point of sale ("POS") terminal 132 to conduct a transaction.

In block 215, a user 101 initiates a digital wallet application 111 and swipes or taps the user computing device 110 on a POS terminal reader 134. In an example, the user 101 approaches a merchant system POS terminal 132 with one or more items for purchase. The user 101 initiates the digital wallet application 111 and prepares the digital wallet application 111 for conducting a transaction. For example, the user 101 selects an icon or other object to initiate the digital wallet application 111. The user 101 may make a selection on the digital wallet application 111 to specify which payment instrument should be used in a subsequent transaction or make any other suitable selections.

The user 101 swipes or taps the user computing device 110 and initiates a communication between the user computing device 110 and the POS terminal 132. The tap may represent any action that is required to initiate a communication with the POS terminal 132. For example, the tap may require that the user 101 place the user computing device 110 flat on a surface of a card reader 134. In another example, the tap may require that the user 101 hover the user computing device 110 near an antenna of a card reader 134. Any other type of tap, swipe, or other initiating actions, may be employed. The POS terminal 132 may employ a card reader 134 or other hardware or software to communicate wirelessly with the user computing device 110 via NFC or other suitable technology.

In block 220, a transaction is conducted between a payment processing system (not pictured) and the merchant system 130. In an example, the card reader 134 or other communication element of a POS terminal 132 requests payment account information and other suitable data from the digital wallet application 111. The digital wallet application 111 assembles the necessary data for responding. The data may include the payment account number of a payment instrument, the expiration date of the payment instrument, and other suitable data.

The digital wallet application 111 transmits the payment account information to the reader 134 or other element of the POS terminal 132. The card reader 134 provides the payment account information to POS terminal 132. The card reader 134 transmits the collected data to the POS terminal 132 via any available communication technology. The POS terminal 132 transmits an authorization request a suitable payment processing system that is associated with the payment instrument on the digital wallet application 111. The POS terminal 132 identifies a transaction total and provides an authorization request to a credit card network, a payment processing system, a banking institution, or any suitable system that will provide an authorization for the transaction and process the transaction. The authorization, or a notification that the authorization has been received, is provided to the POS terminal 132 and the transaction is completed. The POS terminal 132 displays the authorization to the user 101 and/or a salesperson of the merchant system 130. The user 101 receives the purchased product or service and a paper or digital receipt for the transaction.

In block 225, the digital wallet application 111 communicates transaction data to the digital wallet system 140. After the transaction is completed, the digital wallet application 111 recognizes that the POS terminal 132 has communicated information indicating that the transaction is complete, such as a receipt. The communication from the POS terminal 132 may be via NFC or any other suitable technology. The digital wallet application 111 communicates the completion of the transaction to the digital wallet system 140 via an Internet connection via the network 105, or via any other suitable technology. In another example, the digital wallet system 140 recognizes the transaction from the authorization process and does not require notification by the digital wallet application 111.

In block 230, the digital wallet application 111 receives a collectible icon animation from the digital wallet system 140. When the digital wallet system 140 receives notification that the transaction has been completed, the digital wallet system 140 determines if the transaction was conducted via a preferred transaction method, or if another preferred action was performed that is to be rewarded. In an example, the collectible icon animation is to be provided in the post-transaction experience for transactions conducted via NFC. In another example, the post-transaction experience is provided for transactions conducted online using the digital wallet application 111. The digital wallet system 140 is able to determine the transaction method from details provided by the digital wallet application 111. Any other suitable action may be rewarded with the post-transaction experience, such as a check-in interaction, a verification interaction, an access interaction, or any other suitable interaction.

If the transaction was conducted via a preferred transaction method, the digital wallet system 140 identifies the post-transaction experience to be provided to the digital wallet application 111. The post-transaction experience may be a collectible icon animation. For example, the collectible icon animations to be provided to the digital wallet application 111 may be based on chance. That is, if five collectible icons are available for collecting, the digital wallet system 140 may provide one of the collectible icons and the associated animations to the digital wallet application 111 based on a random chance. For example, a random number generator may be used to select which collectible icon animation to provide. In an example, the user 101 may receive a collectible icon animation that has already been collected. Some collectible icon animation may be provided less frequently than other collectible icon animations. The user 101 will thus be incentivized to keep attempting interactions to obtain an elusive collectible icon animation.

In another example, the collectible icon animations to be provided to the digital wallet application 111 may be based on a rewards program, an advertising campaign, a transaction amount, the status of the user account, the type of merchant system 130, or any other suitable characteristic of the transaction. The digital wallet system 140 determines the appropriate collectible icon animations for the user 101, and communicates the collectible icon animations to the digital wallet application 111. The communication may be sent via an Internet connection over the network 105 or via any other suitable technology.

In an alternate example, the digital wallet application 111 accesses or provides the post-transaction experience. For example, the digital wallet system 140 may communicate a series of collectible icon animations to the digital wallet application 111 for storage. The digital wallet application 111 then accesses one of the collectible icon animations after approved transactions. In another example, the digital wallet application 111 is provided instructions to communicate with a third party server to access the post-transaction experience. Any suitable manner of accessing a post-transaction experience, such as a collectible icon animation, may be employed.

In block 235, the user interface 114 displays the collectible icon animations for the user 101 to view via a graphical user interface 114. The collectible icon animations may perform any suitable actions on the graphical user interface 114 of the user computing device 110. For example, a collectible icon animation may appear on the graphical user interface 114 and perform any suitable action, such as a dance, a skit, a routine, a magic act, a sports action, a joke, or any other suitable action. The collectible icon animation may surprise the user 101 by appearing suddenly on the graphical user interface 114 or by slowly encroaching on the display of the graphical user interface 114. The collectible icon animation may incorporate functions of the graphical user interface 114 that are already present. For example, the collectible icon animation may change the appearance of certain interface objects or displays to incorporate logos or styles associated with the collectible icon animation.

In block 240, the graphical user interface 114 incorporates the collectible icon in the collectible icon animation into the user interface objects and displays. After collecting the collectible icon, the graphical user interface 114 may add the collectible icon to a display of collected collectible icons. For example, the graphical user interface 114 adds the collectible icon to a collectible icon card that displays all of the collectible icons that have been obtained. The collectible icon card may be associated with a campaign associated with a particular group of collectible icons, such as a group of superheroes or a sports team. The collectible icon card may have a section or portion of the card devoted to the particular collectible icon for the time when the collectible icon is obtained. After obtaining the collectible icon, the portion of the collectible icon card devoted to the particular collectible icon displays the collectible icon.

In block 245, the graphical user interface 114 offers an opportunity to share the collectible icon. The collectible icon animations or the collectible icons themselves may be shared with others via a social network of the user 101. For example, the graphical user interface 114 displays an interface object, such as a "share" button, that allows a user 101 to share with a social network that a particular collectible icon has been obtained. The user 101 may additionally select an interface object to show the collectible icon animation associated with a particular collectible icon at any suitable time. The collectible icon animation may be configured to display at any other suitable time, such as when the user 101 opens the digital wallet application 111 or when a user 101 attempts a subsequent transaction.

In block 250, the user 101 is encouraged to use the preferred digital wallet application 111 purchasing method for subsequent transactions. When the user 101 receives the post-transaction experience, such as a fun collectible icon animation, the user 101 is incentivized to use the digital wallet system 140 more frequently, which causes all of the systems involved to operate more efficiently.

Figure 4:
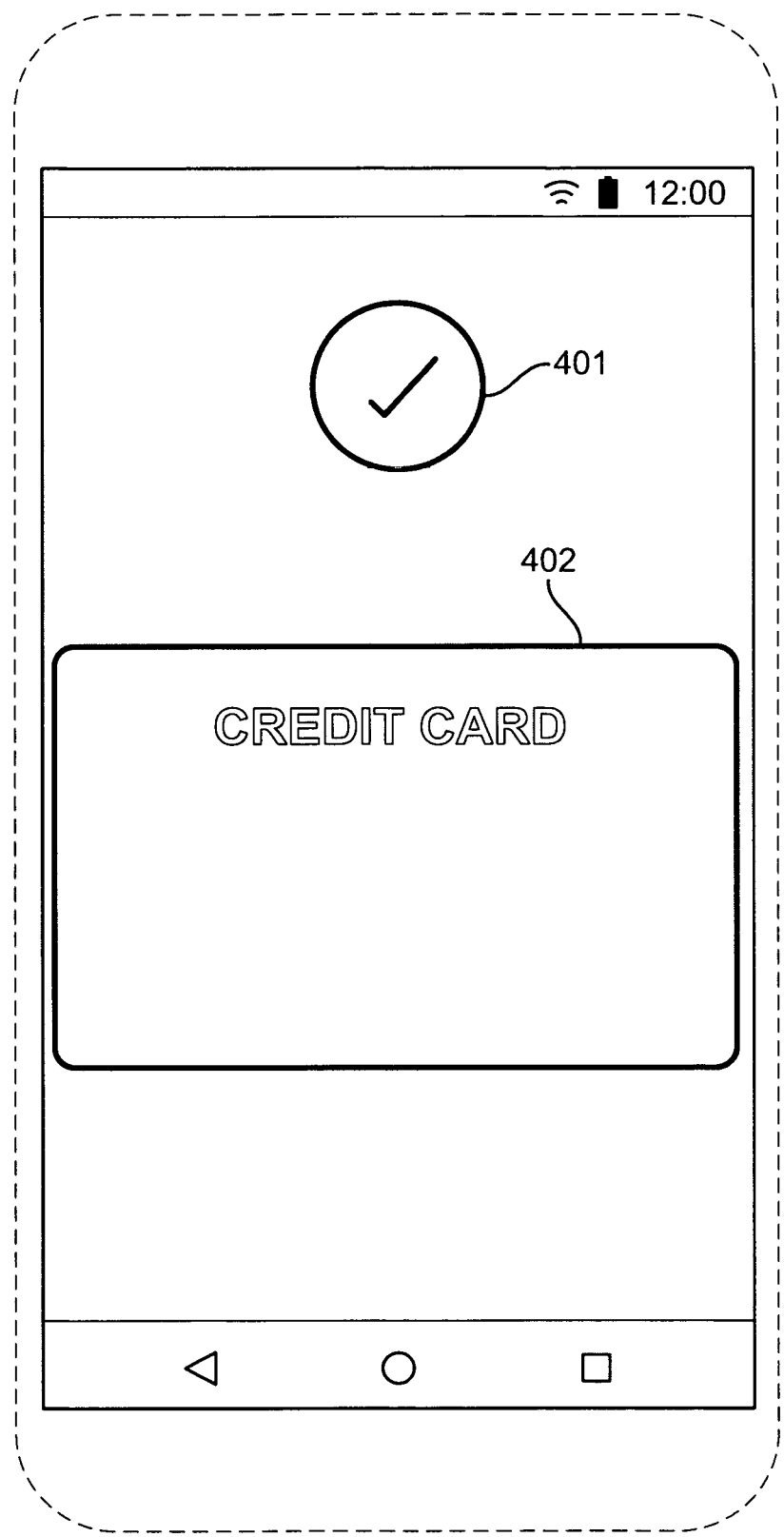
FIG. 4 is first image in a sequence for a display screen or portion thereof with an animated graphical user interface, in accordance with certain examples.

An example of the display of the collectible icon animations to the user 101 is shown in FIGS. 4-10. FIG. 4 is a first image in a sequence for a display screen or portion thereof with an animated graphical user interface, in accordance with certain examples.

An example user computing device 110 is provided in FIG. 4. The user computing device 110 is shown in FIG. 4 as a mobile smartphone with a display screen presenting a graphical user interface. In the example, the graphical user interface presents post-transaction collectible icon animations to a user 101 including a collectible icon animations display. In FIG. 4, the example graphical user interface display illustrates an object 401 indicating that the transaction is complete. The object 401 displays a checkmark to indicate that that transaction was a success. The payment instrument that was used to conduct the transaction is displayed as payment instrument 402.

Figure 5:
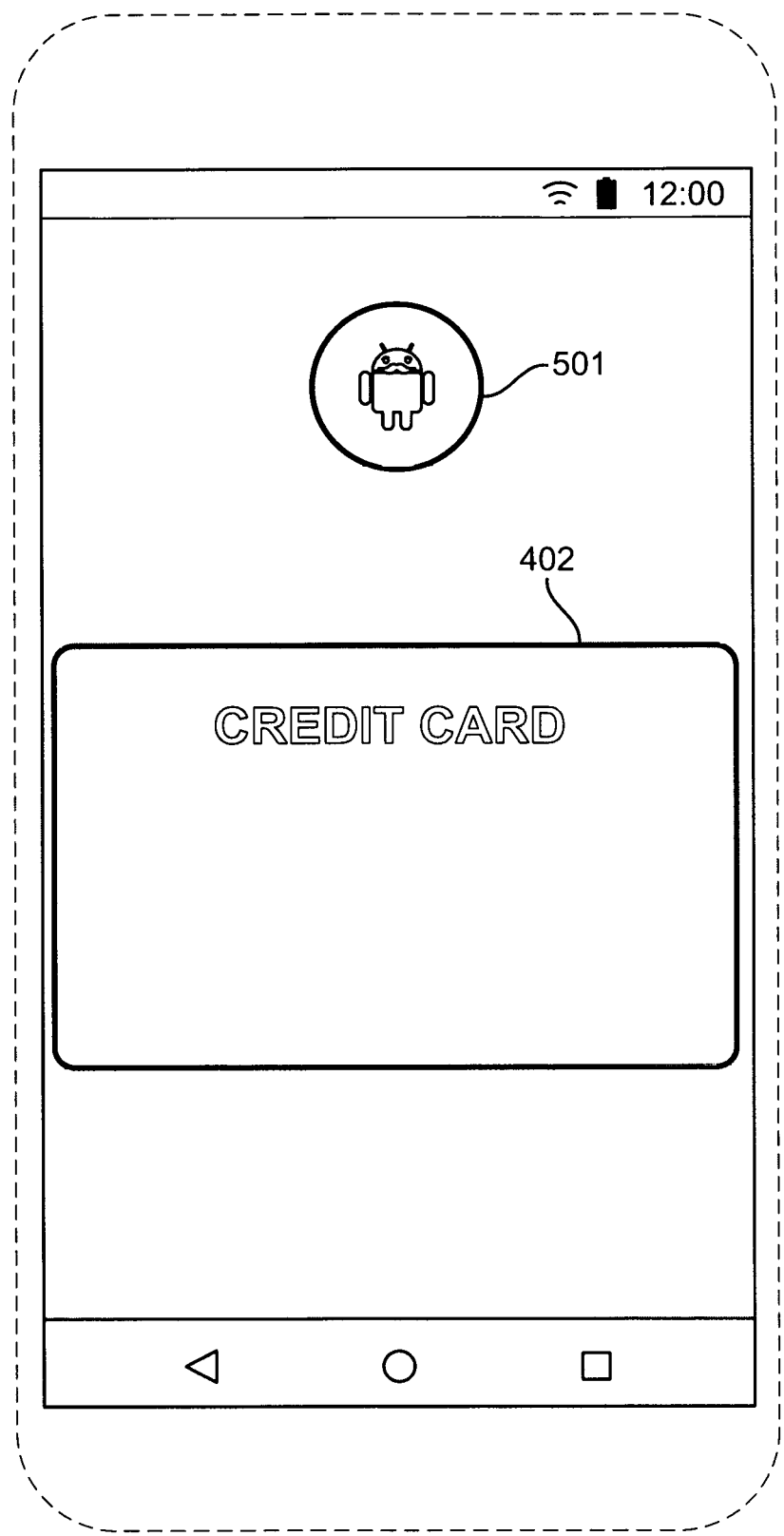
FIG. 5 is second image in a sequence for a display screen or portion thereof with an animated graphical user interface, in accordance with certain examples.

FIG. 5 is second image in a sequence for a display screen or portion thereof with an animated graphical user interface, in accordance with certain examples. The object 401 indicating that the transaction was a success is replaced by a first indication that a character icon has been obtained and the character icon animation is beginning. In the example of FIG. 5, a representation of the character icon 501 appears in place of the checkmark in the object 401. The character icon 501 may appear in any suitable manner, such as by growing in size, suddenly appearing, entering the screen from the side, or in any suitable animation manner.

Figure 6:
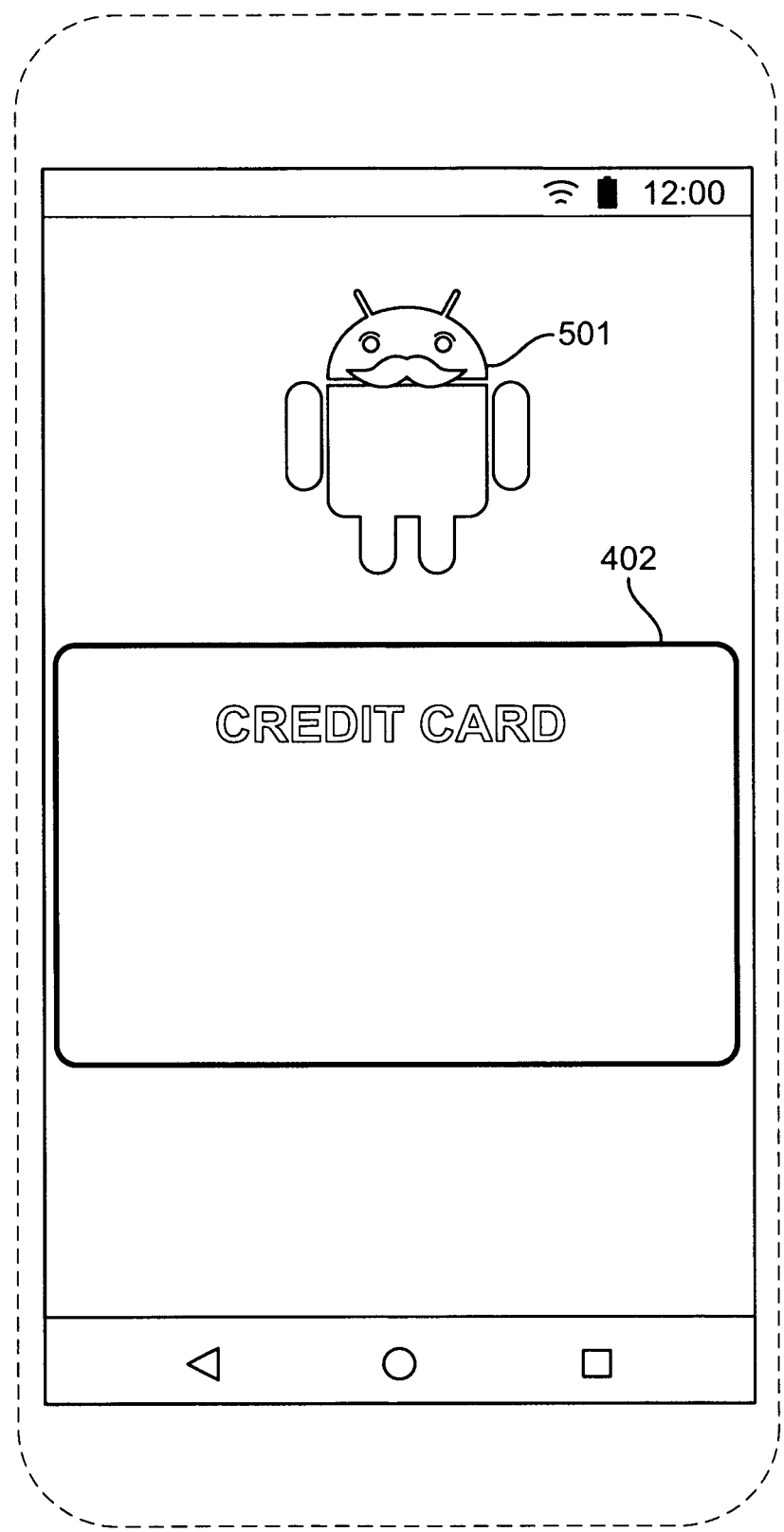
FIG. 6 is third image in a sequence for a display screen or portion thereof with an animated graphical user interface, in accordance with certain examples.

FIG. 6 is third image in a sequence for a display screen or portion thereof with an animated graphical user interface, in accordance with certain examples. The character icon 501 is depicted as having grown to a full size for display on the screen. The character icon 501 may perform any configured animation, such as a dance, a skit, a routine, a magic act, a sports action, a joke, or any other suitable animated action. Any desired text or sound may accompany the animation. The animation is intended to entertain and delight the user 101. In the example the graphical user interface would transition from FIG. 4 to FIG. 5 to FIG. 6 sequentially. In another example, the graphical user interface would transition to FIG. 7 after FIG. 6.

Figure 7:
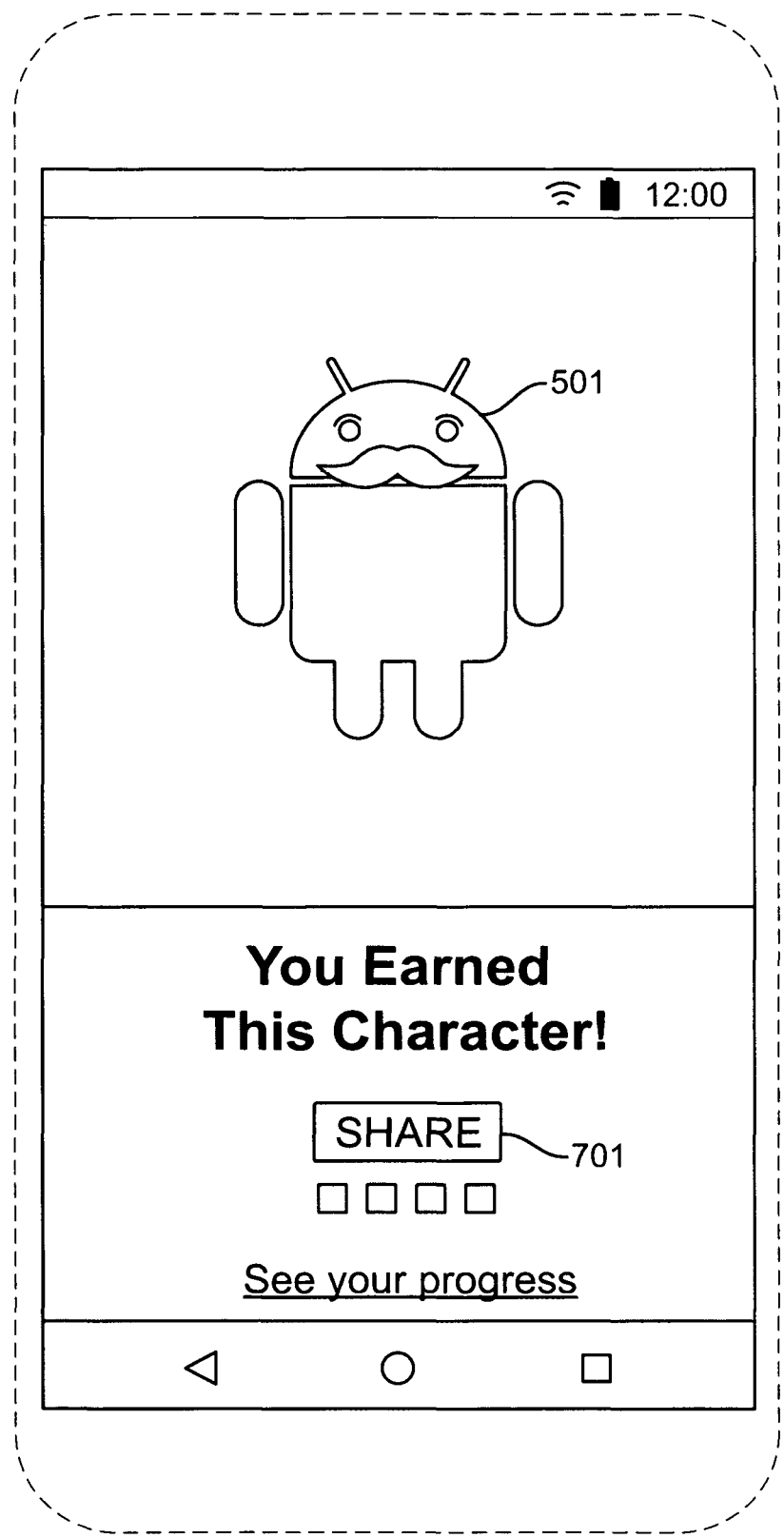
FIG. 7 is an illustration of an example graphical user interface displaying a collectible icon, in accordance with certain examples.

FIG. 7 is an illustration of an example graphical user interface displaying a collectible icon, in accordance with certain examples. The character icon 501 is displayed to the user 101 after the animation is complete or during the animation with an indication that the character icon 501 has been obtained by the user 101. The screen displays an option to share the character icon 501. For example, an interface object 701 is displayed. If actuated by the user 101, the interface object 701 causes sharing of the character icon 501 with a social network of the user 101. For example, the graphical user interface uploads a display of the character icon 501 or the full animation of the character icon 501 to a social network page of the user 101. The social network page may provide information to the social network that the user 101 has obtained the character icon 501 and a request others to join the user 101 in collecting the character icon 501 by using the digital wallet application.

Figure 8:
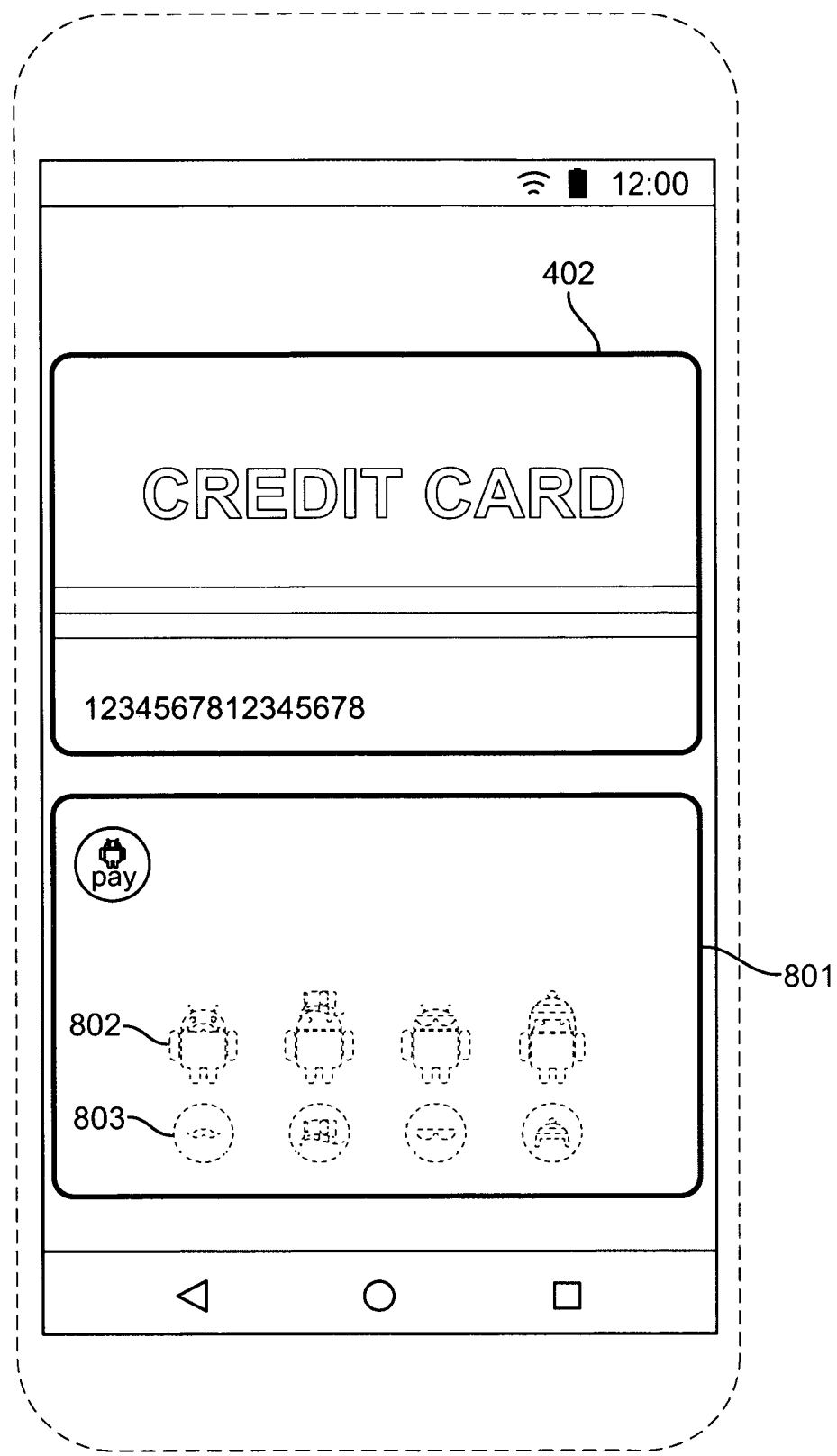
FIG. 8 is an illustration of an example graphical user interface displaying an empty collectible icon card, in accordance with certain examples.

FIG. 8 is an illustration of an example graphical user interface displaying an empty collectible icon card 801, in accordance with certain examples. After collecting the collectible icon as described previously, the graphical user interface may add the collectible icon 501 to a display of collected collectible icons on a collectible icon card 801. As illustrated, the collectible icon card 801 is shown without any character icons stored on the card. The collectible icon card 801 is illustrated as being associated with a campaign associated with a particular group of collectible icons, such as a group of superheroes, movie characters, or a sports team, and depicts the group of icons the use can collect in the campaign. The collectible icon card 801 may have a section 802 devoted to the particular collectible icon 501 for the time when the collectible icon 501 is obtained, as well as sections devoted to the other collectible icons in the campaign. The section 802 for the collectible icon 501, as well as the other sections devoted to the other collectible icons in the campaign, is greyed out, shown in silhouette, or otherwise obscured until the collectible icon 501 is obtained. The collectible icon card 801 additionally is illustrated with a logo 803 for the collectible icon 501 in a circle, as well as logos devoted to the other collectible icons in the campaign. The logo 803 is a symbol or other short-form indication of the collectible icon. The logo 803, as well as the logos devoted to the other collectible icons in the campaign, is similarly shown as obscured until the collectible icon 501 is obtained. FIG. 8 additionally includes an image of the payment instrument 402 displayed.

Figure 9:
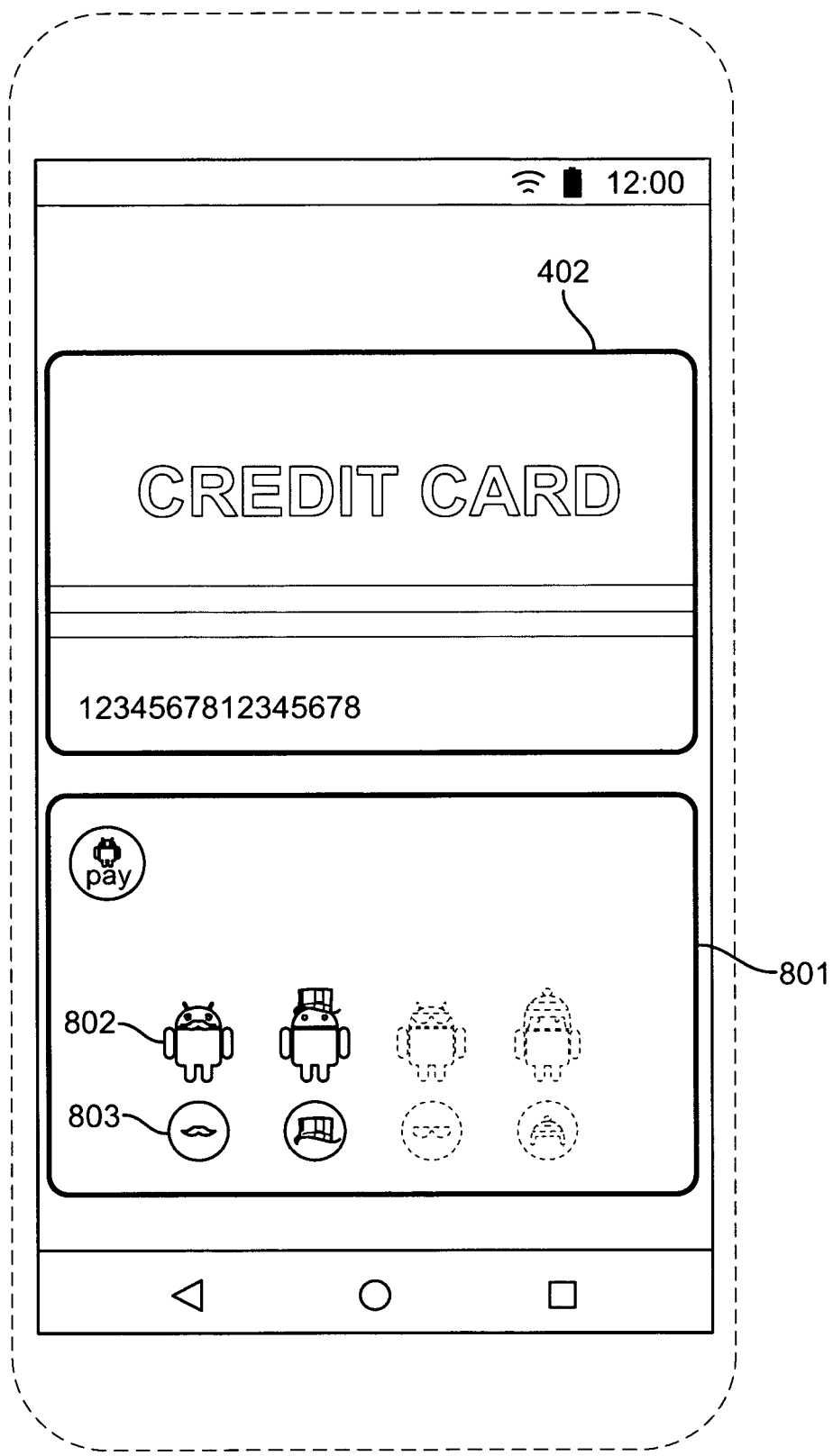
FIG. 9 is an illustration of an example graphical user interface displaying a collectible icon card with two collectible icons, in accordance with certain examples.

FIG. 9 is an illustration of an example graphical user interface displaying a collectible icon card with two collectible icon sections 802 displayed, in accordance with certain examples. After obtaining the collectible icon 501, the portion of the collectible icon card 801 devoted to the particular collectible icon 501 displays a representation of the collectible icon 501 in the section 801 of the collectible icon card 801. In the example, the previously obscured section 802 now displays a representation of the collectible icon 501 that is not obscured or greyed out. In the illustration, two of the sections include a collectible icon, such as collectible icon 501, while the other two sections remain obscured. FIG. 9 depicts that the user has collected two of the four icons in the campaign.

Additionally, a display of the logo 802 of the collectible icon 501 is displayed and is not obscured or greyed out. In the illustration, two of the logos 803 include a collectible logo, while the other two logos remain obscured.

FIG. 9 additionally includes an image of the payment instrument 402 displayed.

Figure 10:
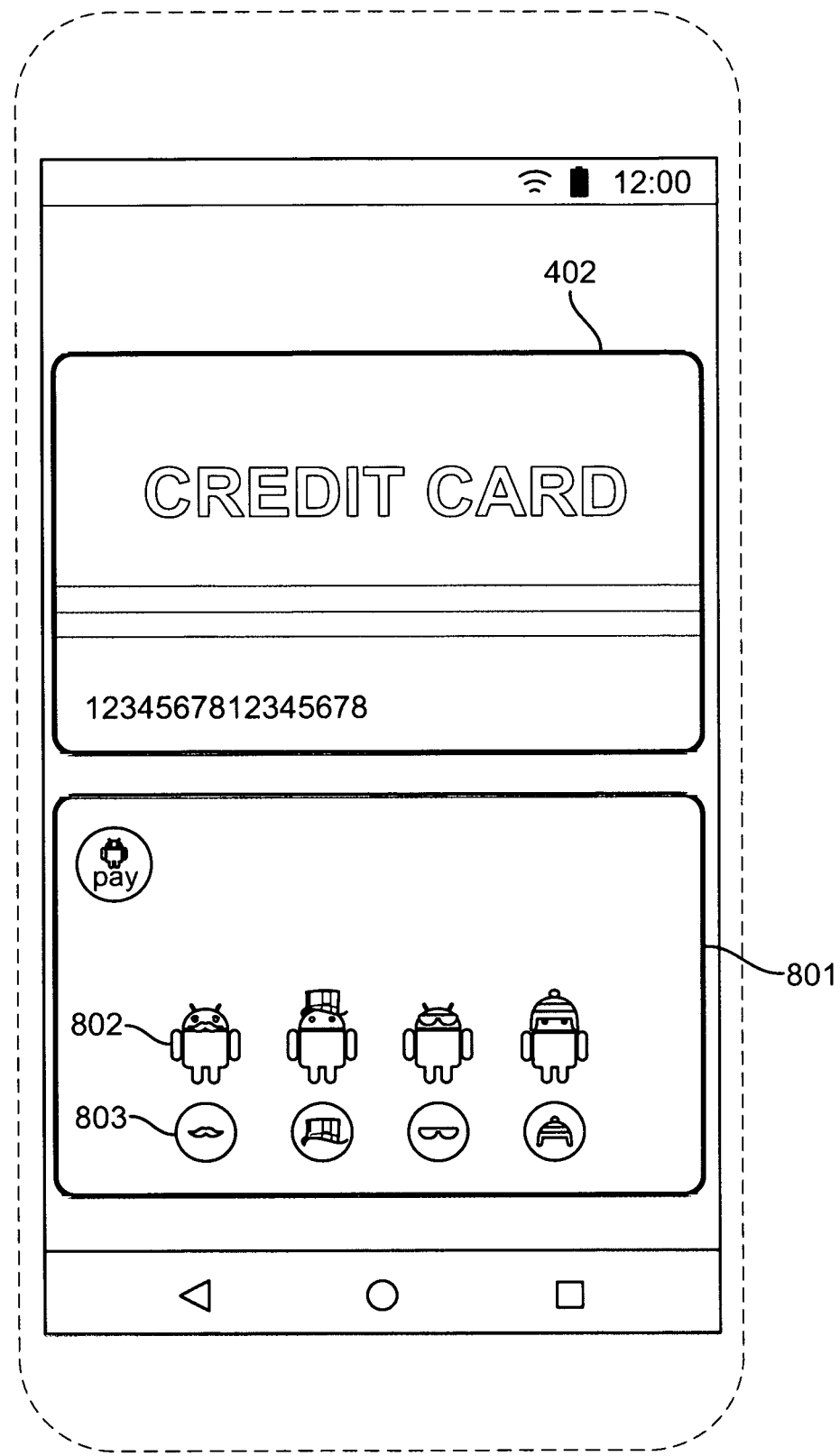
FIG. 10 is an illustration of an example graphical user interface displaying a completed collectible icon card, in accordance with certain examples.

FIG. 10 is an illustration of an example graphical user interface displaying a completed collectible icon card 801, in accordance with certain examples. The previously obscured section 802 displays a representation of each collectible icon 501 that is not obscured or greyed out. In the illustration, all the sections include a collectible icon, such as collectible icon 501, while none of the sections remain obscured. The collectible icon card 801 is thus completely filled with the collectible icons and logos. The user 101 may display the collectible icon card 801 or perform any other suitable action with the completed collectible icon card 801. In an example, after completing a collectible icon card 801, the user 101 receives a special reward, award, additional character icon, or any other suitable prize.

Example Systems

FIG. 11 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to render graphical user interfaces to display post action collectible icon animations, comprising:
    displaying, using a user interface of one or more computing devices, a digital wallet application to a user to initiate a wireless transaction;
    receiving, using the one or more computing devices and from a merchant system, a request to provide payment information to conduct the wireless transaction;
    providing, using the one or more computing devices, payment account information from the digital wallet application to the merchant system;
    receiving, using the one or more computing devices, a notification from the merchant system that the transaction has been authorized;
    communicating, using the one or more computing devices and to a digital wallet system associated with the digital wallet application, that the transaction has been authorized and that a first communication technology was used to transmit the payment account information from the digital wallet application to a point of sale device associated with the merchant system, wherein the first communication technology includes at least one of near field, bluetooth, infrared, or peer to peer communication;
    receiving, using the one or more computing devices and from the digital wallet system, a post-transaction collectible icon animation, wherein the post-transaction collectible icon animation is received from the digital wallet system only when the first communication technology corresponds to a preferred communication technology associated with the digital wallet system; and
    rendering, using the user interface on the one or more computing devices, the post-transaction collectible icon animation.

2. The computer-implemented method of claim 1, wherein the post-transaction collectible icon animation is a collectible icon animation that is one of a set of two or more collectible icon animations.

3. The computer-implemented method of claim 1, wherein the post-transaction collectible icon animation is an animation associated with a particular collectible icon.

4. The computer-implemented method of claim 3, wherein the collectible icon is stored on a section of a collectible icon card of the graphical user interface.

5. The computer-implemented method of claim 3, wherein the collectible icon is one of a superhero character, a movie character, or a sports character.

6. The computer-implemented method of claim 1, further comprising rendering, using the one or more computing devices, an interface object to share the collectible icon animation on a social network of the user.

7. The computer-implemented method of claim 1, wherein the collectible icon animation obtained is based on a random selection of the digital wallet system.

8. A computer program product, comprising
    a non-transitory computer-readable storage device having computer-executable program instructions embodied thereon that when executed by one or more computing devices cause the computer to render graphical user interfaces to display post-action collectible icon animations, the computer-readable program instructions comprising:
    computer-executable instructions to display a digital wallet application to a user to initiate a wireless interaction;
    computer-executable instructions to receive a from a third party system, a request to provide account information to conduct the wireless interaction;
    computer-executable instructions to provide the account information from the digital wallet application to the third party system;
    computer-executable instructions to receive a notification from the third party system that the interaction has been authorized;
    computer-executable instructions to communicate to an application system associated with the digital wallet application that the transaction has been authorized and that a first communication technology was used to transmit the account information from the digital wallet application to a point of sale device associated with the third party system, wherein the first communication technology includes at least one of near field, bluetooth, infrared, or peer to peer communication;
    computer-executable instructions to receive from the application system, a post-interaction collectible icon animation, wherein the post-transaction collectible icon animation is received from the application only when the first communication technology corresponds to a preferred communication technology associated with the digital wallet application; and
    computer-executable instructions to render the post-interaction collectible icon animation graphical user interface.

9. The computer program product of claim 8, wherein the post-transaction collectible icon animation is a collectible icon animation that is one of a set of two or more collectible icon animations.

10. The computer program product of claim 8, wherein the post-transaction collectible icon animation is an animation associated with a particular collectible icon.

11. The computer program product of claim 10, wherein the collectible icon is stored on a section of a collectible icon card of the graphical user interface.

12. The computer program product of claim 10, wherein the collectible icon is one of a superhero character, a movie character, or a sports character.

13. The computer program product of claim 8, further comprising computer-executable instructions to render an interface object to share the collectible icon animation on a social network of the user.

14. A system to display post-action collectible icon animations, comprising:
    a storage device; and
    a processor communicatively coupled to the storage device, wherein the processor executes application code instructions that are stored in the storage device to cause the system to:

display a digital wallet application to a user to initiate a wireless interaction;
receive a from a third party system, a request to provide account information to conduct the wireless interaction;
provide the account information from the digital wallet application to the third party system;
receive a notification from the third party system that the interaction has been authorized;
communicate to an application system associated with the digital wallet application that the transaction has been authorized and that a first communication technology was used to transmit the account information from the digital wallet application to a point of sale device associated with the third party system, wherein the first communication technology includes at least one of near field, bluetooth, infrared, or peer to peer communication;
receive from the application system, a post-interaction collectible icon animation, wherein the post-transaction collectible icon animation is received from the application system only when the first communication technology corresponds to a preferred communication technology associated with the application system; and
render the post-interaction collectible icon animation graphical user interface.

15. The system of claim 14, wherein the collectible icon animation obtained is based on a random selection of the application system.

16. The system of claim 14, wherein the post-transaction collectible icon animation is an animation associated with a particular collectible icon.

\* \* \* \* \*